United States Patent [19]

Lindsey et al.

[11] Patent Number: 5,378,017
[45] Date of Patent: Jan. 3, 1995

[54] AUTO IGNITION IN GAS GENERATOR

[75] Inventors: David W. Lindsey, Ogden; Kurt E. Kottke, Bountiful, both of Utah

[73] Assignee: Morton International, Inc., Chicago, Ill.

[21] Appl. No.: 76,618

[22] Filed: Jun. 11, 1993

[51] Int. Cl.⁶ ............................................. B60R 21/26
[52] U.S. Cl. .................... 280/736; 280/741; 422/166; 102/531
[58] Field of Search ............. 280/736, 740, 741; 102/530, 531, 481; 422/164, 165, 166

[56] References Cited

U.S. PATENT DOCUMENTS

| | | | |
|---|---|---|---|
| 4,084,512 | 4/1978 | San Miguel | 102/481 |
| 4,561,675 | 12/1985 | Adams et al. | 280/734 |
| 4,944,528 | 7/1990 | Nilsson | 280/741 |
| 4,998,751 | 3/1991 | Paxton et al. | 280/741 |
| 5,106,119 | 4/1992 | Swann et al. | 280/731 |
| 5,109,772 | 5/1992 | Cunningham et al. | 102/275 |
| 5,114,179 | 5/1992 | Emery et al. | 280/741 |
| 5,139,280 | 8/1992 | Cord et al. | 280/741 |
| 5,186,491 | 2/1993 | Yoshida et al. | 280/741 |
| 5,253,895 | 10/1993 | Bretfeld | 280/736 |

FOREIGN PATENT DOCUMENTS 488938  6/1992  European Pat. Off. ............ 280/736

*Primary Examiner*—Karin L. Tyson
*Attorney, Agent, or Firm*—Nick C. Kottis; Gerald K. White

[57] ABSTRACT

An enclosure, adapted to hold an auto ignition material in a gas generator that employs solid fuel gas generant material to effect inflation of a protective bag to cushion a passenger from impact with the structure of a vehicle in the event of a crash, is provided.

20 Claims, 3 Drawing Sheets

AUTO IGNITION IN GAS GENERATOR

BACKGROUND OF THE INVENTION

This invention relates generally to gas generators for inflating vehicular inflatable restraint cushions, commonly known as air or gas bags, to provide impact protection to occupants of the vehicle. More particularly, the invention relates to the auto ignition of such gas generators.

It is well known to protect a vehicle occupant using a cushion or bag that is inflated/expanded with gas, e.g., an "air bag", when the vehicle encounters sudden deceleration, such as in a collision. In such systems, the cushion is normally housed in an uninflated and folded condition to minimize space requirements. Upon actuation of the inflatable restraint system, the air bag is commonly inflated in a matter of a few milliseconds with gas produced by the burning of a gas generant material, e.g., a pyrotechnic, in a device commonly referred to as "a gas generator" or "an inflator." The gas generant is commonly ignited by means of an igniter having an ignition agent. The pressure of the combustion gases resulting from the rapid burning of the gas generant material causes gas to rush into the air bag to effect the rapid inflation thereof. The cushion can then serve to restrain the movement of the vehicle occupant as the collision proceeds.

Inflatable restraint systems have been devised for automotive vehicles in which one or more air bags are stored in one or more storage compartments within the vehicle. In general, an air bag provided for the protection of a vehicle driver, e.g., a driver side air bag, is stored within a housing mounted in a storage compartment located in the steering column of the vehicle. Whereas, an air bag for the protection of a front seat passenger, e.g., a passenger side air bag, is typically stored within a housing mounted in the instrument panel/dash board of the vehicle.

In such systems, the gas generators or inflators must be constructed to withstand large thermal and mechanical stresses during the gas generation process. Thus, gas generators have been fabricated using steel for the casing and other structural components, with the structural components commonly joined together by screw threads, roll crimping or welding.

To satisfy light weight specifications, significant weight reduction can be achieved through the utilization of a light metal or material such as aluminum or an aluminum alloy for the generator housing and other structural components. Gas generators made of such materials typically will not experience problems in ordinary use wherein, during the event of a collision, the ignition agent is ignited, followed by the igniting of the gas generant to generate inflation gas. However, the mechanical strength of such lighter weight materials is lowered when overheated to a high temperature.

For example, a problem is encountered when generators utilizing aluminum for the housing construction are subjected to a high temperature environment, such as a bonfire. This problem stems from the fact that at a temperature in the 650° F. (343° C.) range, the pyrotechnics of the gas generator commonly automatically ignite. In this temperature range, the aluminum of the housing structure degrades and tends to rupture or burst, projecting pieces and/or fragments in all directions. This problem is not encountered with gas generators that employ steel in the housing structure since steel does not degrade until a much higher temperature of about 1100° F. (593° C.) is reached. Thus, the use of aluminum, in place of steel, in a gas generator, while serving to reduce the weight of the assembly typically results in the gas generator having a lower internal pressure capability. This lower internal pressure capability could be hazardous in a high temperature environment such as the gas generator might be subjected to in the event of a fire whether in storage, in transit, or after installation in a vehicle.

A previously disclosed solution to the this problem is the incorporation of an auto ignition device in the gas generator. For example, U.S. Pat. No. 4,561,675, Adams et al., assigned to the assignee of the present invention and which patent is incorporated herein in its entirety, discloses an auto ignition device that causes the pyrotechnics in a gas generator to function when the device is subjected to a predetermined high temperature below the ignition temperature of the solid fuel gas generant. The container of the auto ignition device is disclosed as being hat shaped and includes a brim and a crown, with the crown attached in thermal contact with the generator housing and with the area of a wall of the container bound by the brim being closed by a foil seal.

The inclusion of an auto ignition material in an inflator housing such as is used for inflators for driver side installations is also disclosed in U.S. Pat. Nos. 5,106,119 and 5,114,179 which disclose a housing apparatus wherein, by means of a piece of aluminum foil, a "packet" auto ignition material is held in place in a recess formed in the canister cover. Also, U.S. Pat. No. 5,186,491 discloses the incorporation of an auto ignition material within a recess of the gas generator.

In addition, U.S. Pat. Nos. 4,998,751 and 5,109,772, both assigned to the assignee of the present invention and which patents are incorporated herein in their entirety, generally relate to inflator devices and, at least in some specifically described and illustrated embodiments such gas generators having elongated bodies, as are commonly used on the passenger side of an automotive vehicle. These patents disclose the incorporation, respectively, of "an auto ignition device" and "a container" which "holds or contains auto ignition granules" in such gas generators within a centrally located recess. Thus, it is known to place auto ignition granules within a container within such an elongated gas generator housing at one end thereof opposite an end of a elongated igniter tube. Furthermore, it is known to use a cup-shaped container to hold such granules. Such a cup-shaped container has in the past included three equally spaced ribs on the outside thereof allowing for the press fit insertion of the container within the gas generator. In the past, such a cup-shaped container has also included a bendable flange to secure a screen over the mouth of the cup wherethrough the gas resulting from the ignition of the auto ignition material is passed to contact the primary ignition tube granules stored in the gas generator.

As vehicular inflatable restraint systems have and are becoming more prevalent, there is greater interest in automating the assembly process to the extent reasonably and safely possible. The automation of production, however, imposes practical limitations on the shapes and forms of items being handled and produced. This is especially important in the manufacture and assembly of safety systems such as vehicular inflatable restraint systems where the margin for error can be critically small.

Thus, there is a continuing need for improving the suitability of inflatable restraint system designs for automated manufacture and assembly without compromising the operational aspects of such systems whereby protection is provided to an occupant.

SUMMARY OF THE INVENTION

A general object of the invention is to provide an improved auto ignition material holding enclosure adapted for use in a gas generator that employs solid fuel gas generant material to effect inflation of a protective bag to cushion a passenger from impact with the structure of a vehicle in the event of a crash.

A more specific objective of the invention is to overcome one or more of the problems described above.

The general object of the invention can be attained, at least in part, through an enclosure adapted for holding an auto ignition material in an auto ignition device adapted for use in a gas generator which includes a tubular housing having an elongated chamber therein containing the solid fuel gas generant material and aperture means therein for directing generated gases to the protective bag. The enclosure includes a retention cup. The inside of the cup is adapted for holding at least one auto ignition material. The outside of the cup has at least five spaced ribs adapted for press fit insertion and retention of the device within the gas generator. The ribs also provide thermal contact between the device and the housing of the gas generator to result in the solid fuel gas generant igniting and the gas generator functioning when the device is first subjected to a predetermined high temperature below the ignition temperature of the solid fuel gas generant. The retention cup includes an axially extending side wall, an end wall which extends inwardly from one end of the side wall at least partially to close one end of the retention cup, and a bendable flange which extends outwardly from an end of the side wall opposite from the at least partially closed end. The enclosure also includes surface means which define a plurality of openings through which hot gas and particulate from the auto ignition material flow outwardly from the cup. The surface means are securable in the enclosure by means of the bendable flange of the retention cup.

The prior art fails to provide either an auto ignition device or an enclosure for holding an auto ignition material particularly suited for use in automated assembly of such units. That is, the auto ignition containers of the prior art, as a result of the loading, handling, and installation processing to which they are subjected necessitate manual verification of proper placing and/or retention, thus requiring a greater extent of human intervention.

The invention further comprehends an enclosure for holding an auto ignition material as a part of an auto ignition device, adapted for use in the automated assembly of a gas generator. The gas generator employs a solid fuel gas generant material to effect inflation of a protective bag to cushion a passenger from impact with the structure of a vehicle in the event of a crash. The gas generator includes a tubular housing having an elongated chamber therein containing the solid fuel gas generant material and aperture means therein for directing generated gases to the protective bag. The enclosure includes a one piece retention cup, the inside of which is adapted for holding auto ignition granules and the outside of which has six equally spaced ribs adapted for press fit insertion within the gas generator whereby at least one of the ribs undergoes deformation resulting in retention of the device within the gas generator. The ribs also provide thermal contact between the device and the gas generator housing to result in ignition of the auto ignition granules which in turn results in ignition of the solid fuel gas generant and functioning of the gas generator when the device is first subjected to a predetermined high temperature below the ignition temperature of the solid fuel gas generant. The cup includes a base portion, a flared neck transition portion and a bendable flange portion. The base portion includes a cylindrical, axially extending side wall with a first and second end and which side wall extends around the auto ignition material. The base portion also includes an end wall which extends inwardly from the first end of the side wall to close one end of the retention cup. The flared neck transition portion has a first and a second end, each having a circular cross section with the diameter of the circular cross section of the first end being less than that of the second end, and with the first end extending outwardly from the second end of the side wall. The flange portion is cylindrical, axially extending and has a greater internal diameter than the side wall of the base portion. A first end of the flange portion extends outwardly from the second end of the flared neck transition portion.

Other objects and advantages will be apparent to those skilled in the art from the following detailed description taken in conjunction with the appended claims and drawings.

BRIEF DESCRIPTION OF THE DRAWINGS

For ease of illustration and discussion, like parts in the drawings are designated by the same reference numeral.

DETAILED DESCRIPTION OF THE INVENTION

Figure 1:
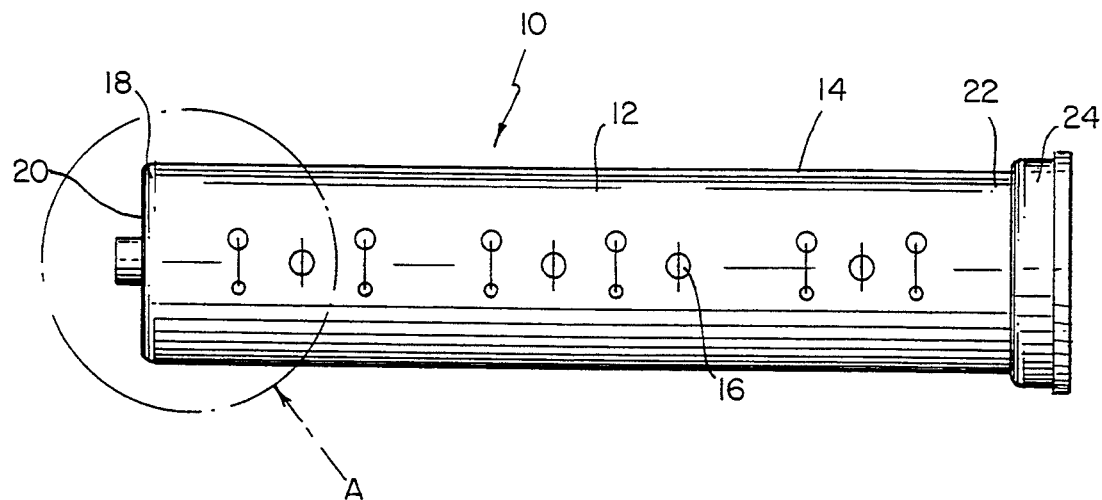
FIG. 1 is a top plan view of a gas generator containing an auto ignition device including an enclosure in accordance with one embodiment of the invention.
Figure 2:
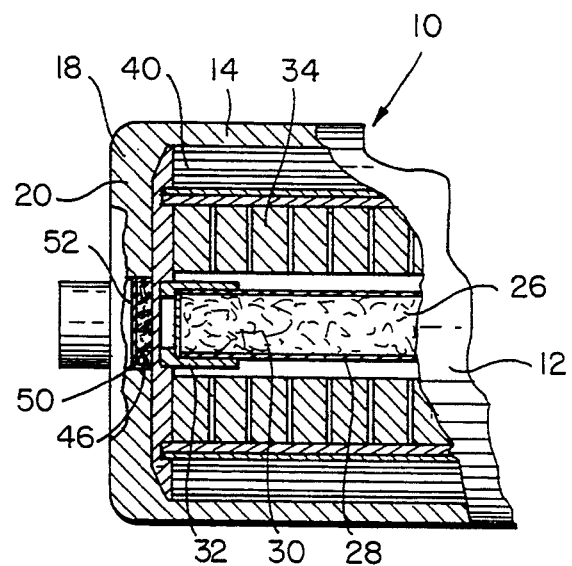
FIG. 2 is a fragmentary, partially in section view of the portion of the gas generator shown in FIG. 1 within the circle A.
Figure 3:
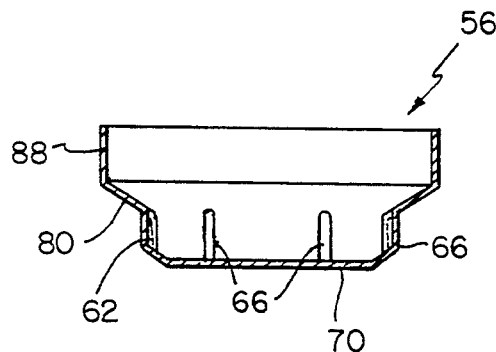
FIG. 3 is a side view of an auto ignition material retention cup in accordance with one embodiment of the invention.

Referring to FIGS. 1 and 2, there is shown a gas generator, generally designated 10, for use in an automotive vehicle inflatable restraint system that includes a protective bag (not shown), commonly referred to as "an air bag," to cushion a passenger from impact with the structure of the vehicle in the event of a crash. The gas generator 10 is particularly adapted for use on the passenger side of the vehicle, being mounted in an appropriate manner in or on the dashboard of the vehicle, for example.

The gas generator 10, as shown, is elongated and includes an elongated tubular outer housing 12 which may be made of aluminum or an aluminum alloy. For most of the length thereof, the outer housing 12 has a thin cylindrical wall 14 in which a plurality of gas exit outlets of holes or other selected aperture means 16 are provided.

One end 18 of the housing 12 is closed by a base member 20 which, as perhaps more clearly shown in FIG. 2, may be formed integrally therewith. The other end 22 of the housing 12 is closed by an end plate or base member 24 which is attached thereto in a sealing manner as by a process such as inertia welding, as is known in the art.

Extending generally over the length of the tubular housing 12 and centrally located therein so as to be generally concentric therewith is an igniter assembly 26. The igniter assembly 26 includes an elongated generally cylindrical perforated tubular member 28 and may be composed of steel or other suitable material. Contained within the tubular member 28 is igniter or pyrotechnic material 30, which may be granular in form.

The igniter assembly 26 is positioned and secured within the gas generator 10 in a known manner such as through the use of a tube locator cap 32 is positioned adjacent the inner side of the base member 20 for facilitating positioning of the igniter assembly 26. As the igniter assembly does not form a part of this invention, it will not be further described. It is to be appreciated, however, that igniter assemblies and their operation are known to those skilled in the art.

Also extending over the length of the tubular housing 12 and positioned concentrically therein in a generally annular shaped arrangement is the solid gas generant material 34, in the form of disks or wafers, as is known to those skilled in the art. The gas generant material 34 may be one of a number of compositions meeting the requirements of burning rate, non-toxicity, and flame temperature. Compositions that may be utilized include the composition described in U.S. Pat. No. 4,203,787, Schneiter et al. and the composition described in U.S. Pat. No. 4,369,079, Shaw. Both of these patents are assigned to the assignee of the present invention and are incorporated herein in their entirety.

The present invention is not limited to any particular composition or geometrical shape or form of the gas generant material. For example, the solid gas generant can take the form of granules, wafers or other selected shape, as desired.

Also extending over the length of the tubular housing 12, positioned concentrically therein and in surrounding relation to the gas generant 34 is a gas cooling and filtering assembly 40. The gas cooling and filtering assembly 40 is annular in cross section and is composed of selected materials, as is known in the art, to effect a suitable cooling and filtering arrangement of the gaseous effluent resulting from the gas generator 10.

A recess 46 is provided in the base member 20 in alignment with the adjacent end of the igniter assembly 26. Within the recess 46 is placed an auto ignition device 50, and including an auto ignition material holding enclosure 52 of the invention. To more clearly show and describe the auto ignition device 50 and the enclosure 52, reference will now be made to FIGS. 3–8.

The auto ignition device 50 includes the enclosure 52 wherein an auto ignition material 54 is held or contained. The enclosure 52 includes a retention cup 56 and a retention disk 58. The retention cup 56 is of generally circular cross section with an inside 60 adapted for holding an auto ignition material and an outside 62 having six equally spaced ribs 66. The ribs 66 are adapted for the press fit insertion of the device 50 into the recess 46 of the gas generator 10.

In general, such press fit insertion is effected as a result of the ribbed outside of the enclosure 52 having a greater external diameter than the diameter of the recess 46, provided in the gas generator 10 and wherein the device 50 is placed. It will be appreciated that upon the insertion of such a shaped and sized device 50 into such a sized recess 46, deformation of one or more and generally all of the ribs 66 of the retention cup 56 will generally occur. Of course, deformation of the rib structure to such an extent that the device 50 is not properly held in place, within the gas generator 10, is to be avoided. The use of retention cups having at least 5 and, preferably 6, of such ribs will be preferred as such a cup will in general have a sufficient number of ribs that even should the process of inserting the device into the gas generator result in one of the ribs undergoing deformation to a greater extent than the others, such as has been known to occur with the previously discussed three rib cup-shaped container, in particular in automated assembly therewith, the remaining number of ribs would still provide sufficient surface area contact between the device and the walls of the recess in the gas generator to prevent the device from becoming dislodged.

As described, the ribs 66 are preferably equally spaced about the outside 62 of the retention cup 56. The use of equally spaced ribs helps minimize the orientation specificity of the enclosure 52 and the device 50 and, as will be further described below, advantageously minimize the need for manual verification of proper insertion, placement, and securing of the device within the selected installation.

Figure 5:
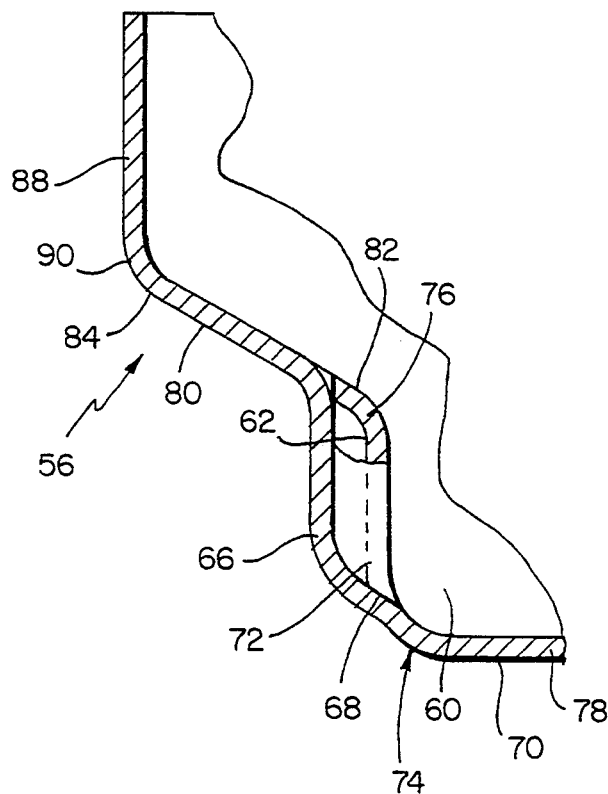
FIG. 5 is an enlarged cross sectional cut away view of the auto ignition material retention cup shown in FIGS. 3 and 4, taken substantially along the line 5—5 of FIG. 4 and viewed in the direction of the arrows.
Figure 4:
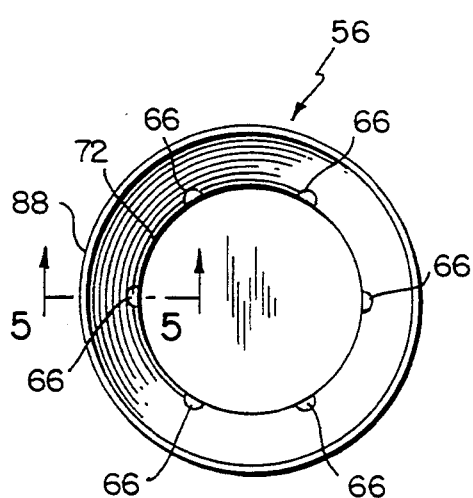
FIG. 4 is a top plan view of the auto ignition material retention cup shown in FIG. 3.

The ribs 66, as perhaps can more clearly be seen in FIG. 5, include a tapered lead surface 68 to facilitate insertion of the device 50 within the recess 46. It is to be understood that the width of the ribs can be appropriately altered so as to provide desired surface area contact between the device 50 and the walls of the recess 46 in the gas generator 10. As will be described in more detail below, the ribs 66 also provide thermal contact between the device 50 and the housing 12.

The retention cup 56 includes a base portion 70 made up of a generally cylindrical, axially extending side wall 72, wherein the ribs 66 are integrally formed, and having a first and a second end, 74 and 76, respectively. The base portion 70 also includes an end wall 78 which extends inwardly from the first end 74 to close that end of the cup 56.

The retention cup 56 further includes a flared neck transition portion 80 having a first and a second end, 82 and 84, respectively, with the first end 82 extending outwardly from the end 76 of the side wall 72. The flared neck transition portion 80 is in the general form of a truncated cone, that is, both the first and second ends, 82 and 84, have a circular cross section with the diameter of the circular cross section of the first end 82 being less than the diameter of the circular cross section of the second end 84.

The retention cup 56 also includes a cylindrical, axially extending bendable flange portion 88 having an end 90 which extends outwardly from the end 84 of the transition portion 80. The internal diameter of the flange portion 88 is shown, and generally is, greater than the internal diameter of the cylindrical side wall 72 of the base portion 70.

The retention cup 56 preferably is of one piece construction. For example, the material of the retention cup can be 0.010 inch (0.0254 cm) or more thick flat aluminum sheet stock or foil which is progressively punched to arrive at the final form. It is to be understood, however, that, if desired, the cup can be of a multi-piece construction such as wherein a flange portion is joined to a base portion, for example.

The retention disk 58 defines a plurality of openings through which hot gas and particulate resulting from the auto ignition material can flow outward from the retention cup 56 towards the igniter assembly 26 (and the igniter or pyrotechnic material 30 contained therewithin) and the solid fuel generant material 34 to result in the solid fuel generant 34 igniting and the gas generator 10 functioning when the device 50 is first subjected to a predetermined high temperature below the ignition temperature of the solid fuel gas generant 34. The screen disk 58 can, for example, be a 50×250 mesh weave of stainless steel or other appropriate material.

Figure 6:
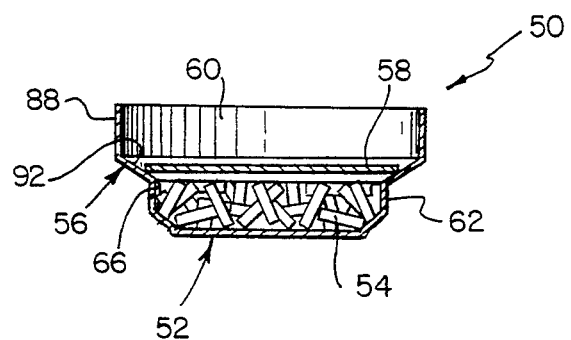
FIG. 6 is a cross sectional side view of an assembly of an auto ignition device at an intermediate point during the assembly process and using the auto ignition material retention cup of FIGS. 3–5.

Turning specifically to FIG. 6, there is illustrated the auto ignition device 50 at an intermediate point in the assembly process. As shown, the retention cup 56 has been appropriately filled with granules of the auto ignition material 54. The retention disk 58 has been placed there over with the perimeter of the disk 58 resting on the inside surface 92 of the flared neck transition portion 80 of the cup 56. The bendable flange portion 88 is shown in a still upright stage.

Figure 7:
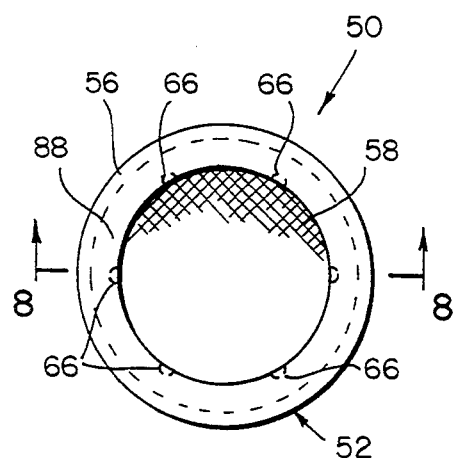
FIG. 7 is a fragmentary top plan view of the assembly of FIG. 6 subsequent to crimping of the bendable flange.
Figure 8:
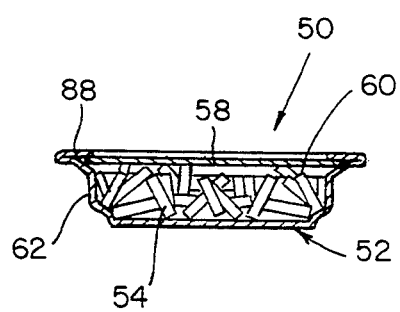
FIG. 8 is a cross sectional side view of the assembly of FIG. 7 taken substantially along the line 8—8 of FIG. 7 and viewed in the direction of the arrows.

Turning now to FIGS. 7 and 8, the bendable flange 88 has subsequently been crimped or otherwise appropriately bent thereby securing the disk 58 in the enclosure 52. As shown by these figures, the completed auto ignition device 50, containing therein the auto ignition material 54, is a neat, generally axially symmetric, self contained unit. As such, the device 50 and the enclosure 52 used therefor are well suited for automated assembly as once the base portion 70 of the enclosure 52 has been properly orientated relative to the recess 46 in which it is to be installed, the enclosure 52 and the device 50 are not otherwise orientation specific. As a result, automated assembly can be used with the efficient minimization of the need for human verification of proper insertion, placement, and securing of the device 50 within the selected installation, as compared with the previously discussed three rib cup-shaped container. Thus, after installation, auto ignition devices utilizing the enclosure of the invention experience a significantly and dramatically lower fall-out rate, as compared to previous cup/container designs.

As identified above, the purpose of the auto ignition device 50 is to rapidly ignite the gas generator 10 when the gas generator 10 is subjected to a high temperature environment, such as a bonfire, at a lower high temperature, e.g., at a temperature of approximately 350° F. (177° C.), than the temperature at which the gas generator 10 would ignite in the absence of such an auto ignition device 50, e.g., a temperature in the range of about 650° F. (343° C.). This better enables the use of aluminum for the gas generator housing 12 as aluminum has sufficient high temperature properties to contain the internal auto ignition pressures at 350° F. (177° C.) but generally not at 650° F. (343° C.).

To better ensure desired functioning of the auto ignition device 50 it is important that enclosure 52 quickly convey heat to which the generator 10 may be subjected to, such as from an external source such as a fire, to the auto ignition material 54 contained therein. To this end, the presence of at least five, preferably six ribs, as the ribs 66 generally serve as the area of contact between the housing 12 and the device 50 and provide the necessary heat transfer surface area therebetween. It will be appreciated by those skilled in the art, that the ribs can be appropriately dimensioned, including the width of thereof, so as to result in the desired heat transfer.

The auto ignition material used within the device may be granule, powder or other material which is stable for long durations of time at temperatures of up to 250° F. (121° C.), will auto ignite at the desired temperature, and provide a hot gas/particulate effluent output sufficient to result in the solid fuel gas generant of the gas generator functioning when the device is first subjected to the predetermined high temperature. The auto ignition material used in the enclosure of the invention may comprise a single material or a mixture of two or more materials, as desired. Long duration stability is needed because of the expected longevity of use, which may be ten (10) years or more, for the vehicle in which the gas generator has been installed. An auto ignition material that has been found to be satisfactory is a nitrocellulose based composition, such as IMR 3031, a product of E.I. Du Pont de Nemours Co. This auto ignition material ignites at a temperature of approximately 350° F. (177° C.).

The foregoing detailed description is given for clearness of understanding only, and no unnecessary limitations are to be understood therefrom, as modifications within the scope of the invention will be obvious to those skilled in the art.

What is claimed is:

1. A gas generator auto ignition enclosure adapted for holding an auto ignition material in an auto ignition device adapted for use in a gas generator that employs solid fuel gas generant material to effect inflation of a protective bag to cushion a passenger from impact with the structure of a vehicle in the event of a crash, which gas generator includes a tubular housing having an elongated chamber therein containing the solid fuel gas generant material and aperture means therein for directing generated gases to the protective bag, said enclosure comprising:

a retention cup with an inside adapted for holding at least one auto ignition material and an outside having at least five spaced ribs adapted for press fit insertion of the device within the gas generator whereupon at least one of said ribs undergoes deformation resulting in retention of the device within the gas generator and thermal contact between the device and the housing to result in the solid fuel gas generant igniting and the gas generator functioning when the device is first subjected to a predetermined high temperature below the ignition temperature of the solid fuel gas generant, said retention cup including an axially extending side wall, an end wall which extends inwardly from one end of said side wall at least partially to close one end of said retention cup, and a bendable flange which extends outwardly from an end of said side wall opposite from said one end, and surface means for defining a plurality of openings through which hot gas and particulate from the auto ignition material flow outwardly from said cup, said surface means being securable in said enclosure by means of said bendable flange.

2. The enclosure of claim 1 wherein said retention cup has a generally circular cross section.

3. The enclosure of claim 1 wherein said ribs are equally spaced.

4. The enclosure of claim 1 having six equally spaced ribs.

5. The enclosure of claim 1 wherein at least one of said ribs comprises a tapered lead surface.

6. The enclosure of claim 1 wherein said surface means comprises a metal mesh screen.

7. The enclosure of claim 1 wherein said retention cup is of one piece construction.

8. The enclosure of claim 7 wherein said retention cup is formed with progressively punched aluminum sheet stock.

9. A gas generator auto ignition enclosure adapted for holding an auto ignition material in an auto ignition device adapted for use in the automated assembly of a gas generator that employs solid fuel gas generant material to effect inflation of a protective bag to cushion a passenger from impact with the structure of a vehicle in the event of a crash, which gas generator includes a tubular housing having an elongated chamber therein containing the solid fuel gas generant material and aperture means therein for directing generated gases to the protective bag, said enclosure comprising:

a one piece retention cup having an inside adapted for holding auto ignition granules and an outside having six equally spaced ribs adapted for press fit insertion within the gas generator whereby at least one of said ribs undergoes deformation resulting in retention of the device within the gas generator and whereby said ribs provide thermal contact between the device and the housing to result in ignition of the auto ignition granules which in turn results in ignition of the solid fuel gas generant and functioning of the gas generator when the device is first subjected to a predetermined high temperature below the ignition temperature of the solid fuel gas generant, said cup including a) a base portion comprising a cylindrical, axially extending side wall which extends around the auto ignition material and includes a first and a second end, and an end wall which extends inwardly from said first end of said side wall to close one end of said retention cup, b) a flared neck transition portion having a first and a second end, each having a circular cross section with the diameter of the circular cross section of the first end being less than that of the second end, and with the first end extending outwardly from said second end of said side wall, and c) a cylindrical axially extending bendable flange portion having a greater internal diameter than said side wall and having a first end extending outwardly from the second end of said transition portion, and screen retention means for defining a plurality of openings through which hot gas and particulate from the auto ignition granules flow outwardly from said cup towards the solid fuel gas generant material, with said bendable flange portion being bent inwardly to secure said screen retention in said enclosure.

10. The enclosure of claim 9 wherein said ribs comprise a tapered lead surface.

11. In a gas generator that employs solid fuel gas generant material to effect inflation of a protective bag to cushion a passenger from impact with the structure of a vehicle in the event of a crash, which gas generator includes a tubular housing having an elongated chamber therein containing elongated igniter means positioned therein with the solid fuel gas generant material distributed throughout the length of the chamber in surrounding relation to the elongated igniter means and wherein adjacent a first end of the elongated igniter means the gas generator includes an auto ignition device having an auto ignition material in a container, the improvement comprising:

said auto ignition material holding container comprising;

a retention cup of circular cross section with an inside adapted for holding an auto ignition material and an outside having at least five equally spaced ribs adapted for press fit insertion of the device within the gas generator whereupon at least one of said ribs undergoes deformation resulting in retention of the device within the gas generator and thermal contact between the device and the housing to result in ignition of the auto ignition material followed by ignition of at least a portion of the elongated igniter means and ignition of the solid fuel gas generant igniting and the gas generator functioning when the device is first subjected to a predetermined high temperature below the ignition temperature of the solid fuel gas generant, said retention cup including an axially extending side wall which also extends around the auto ignition material, an end wall which extends inwardly from one end of said side wall at least partially to close one end of said retention cup, and a bendable flange which extends outwardly from an end of said side wall opposite from said one end, and surface means for defining a plurality of openings through which hot gas and particulate from the auto ignition material flow outwardly from said cup toward the first end of the elongated igniter means, said surface means being securable in said container by means of said bendable flange.

12. The enclosure of claim 11 having six equally spaced ribs.

13. The enclosure of claim 11 wherein at least one of said ribs comprises a tapered lead surface.

14. The enclosure of claim 11 wherein said surface means comprises a metal mesh screen.

15. The enclosure of claim 11 wherein said retention cup is of one piece construction.

16. The enclosure of claim 11 wherein said retention cup is formed with progressively punched aluminum sheet stock.

17. In a gas generator that employs solid fuel gas generant material to effect inflation of a protective bag to cushion a passenger from impact with the structure of a vehicle in the event of a crash, which gas generator includes a tubular housing having an elongated chamber therein containing the solid fuel gas generant material and aperture means therein for directing generated gases to the protective bag, the gas generator including an auto ignition device having an auto ignition material in a container, the improvement comprising:

said auto ignition material holding container comprising;

a one piece retention cup having an inside adapted for holding auto ignition granules and an outside having at least five spaced ribs adapted for press fit insertion within the gas generator whereby at least one of said ribs undergoes deformation resulting in retention of the device within the gas generator, said ribs also providing thermal contact between the device and the housing to result in ignition of the auto ignition granules which in turn results in ignition of the solid fuel gas generant and functioning of the gas generator when the device is first subjected to a predetermined high temperature below the ignition temperature of the solid fuel gas generant, said cup including a) a base portion comprising a cylindrical, axially extending side wall which extends around the auto ignition material and includes a first and a second end, and an end wall which extends inwardly from said first end of said side wall to close one end of said retention cup, b) a flared neck transition portion having a first and a second end, each having a circular cross section with the diameter of the circular cross section of the first end being less than that of the second end, and with the first end extending outwardly from said second end of said side wall, and c) a cylindrical axially extending bendable flange portion having a greater internal diameter than said side wall and having a first end extending outwardly from the second end of said transition portion, and screen retention means for defining a plurality of openings through which hot gas and particulate from the auto ignition granules flow outwardly from said cup towards the solid fuel gas generant material, with said bendable flange portion being bent inwardly to secure said screen retention in said enclosure.

18. The enclosure of claim 17 having six equally spaced ribs.

19. The enclosure of claim 17 wherein said surface means comprises a metal mesh screen.

20. The enclosure of claim 17 wherein said retention cup is of one piece construction.

* * * * *